(12) United States Patent
Krasnansky et al.

(10) Patent No.: US 11,397,137 B2
(45) Date of Patent: Jul. 26, 2022

(54) CLAMPING MECHANISM FOR A TYRE TESTING DEVICE AND METHOD FOR CLAMPING A TESTED TYRE INTO THE CLAMPING MECHANISM

(71) Applicant: ME-INSPECTION SK, s.r.o., Bratislava (SK)

(72) Inventors: Pavol Krasnansky, Bratislava (SK); Miroslav Kriz, Bratislava (SK); Martin Juhas, Bratislava (SK); Michal Sevcek, Bratislava (SK); Marian Sramek, Bratislava (SK)

(73) Assignee: ME-INSPECTION SK, s.r.o., Bratislava (SK)

( * ) Notice: Subject to any disclaimer, the term of this patent is extended or adjusted under 35 U.S.C. 154(b) by 0 days.

(21) Appl. No.: 17/426,721

(22) PCT Filed: Mar. 6, 2020

(86) PCT No.: PCT/SK2020/050003
§ 371 (c)(1),
(2) Date: Jul. 29, 2021

(87) PCT Pub. No.: WO2020/185170
PCT Pub. Date: Sep. 17, 2020

(65) Prior Publication Data
US 2022/0042881 A1    Feb. 10, 2022

(30) Foreign Application Priority Data

Mar. 8, 2019 (SK) .......................... PP 50014-2019

(51) Int. Cl.
*G01M 17/02* (2006.01)
*B60B 30/04* (2006.01)

(52) U.S. Cl.
CPC .......... *G01M 17/021* (2013.01); *B60B 30/04* (2013.01)

(58) Field of Classification Search
CPC .......................... G01M 17/021; B60B 30/04
See application file for complete search history.

(56) References Cited

U.S. PATENT DOCUMENTS

| 2,648,937 A | 8/1953 | Hawkinson |
| 4,852,398 A | 8/1989 | Cargould et al. |

(Continued)

FOREIGN PATENT DOCUMENTS

| CN | 103438776 B | 2/2017 |
| EP | 0496489 A2 | 7/1992 |
| EP | 2244082 A1 | 10/2010 |

OTHER PUBLICATIONS

International Preliminary Report on Patentability; Application No. PCT/SK2020/050003; dated Feb. 15, 2021; 12 Pages.

(Continued)

*Primary Examiner* — Eric S. McCall
*Assistant Examiner* — Timothy P Graves
(74) *Attorney, Agent, or Firm* — Whitmyer IP Group LLC

(57) ABSTRACT

A tyre testing device and clamping system is capable of supporting inflation of tyres having narrower or collapsed sidewalls insofar that the tyre is sealed and inflated at a smaller rim width and subsequently it is open to a specific rim width. The present system is also capable of pressing the sidewalls having larger width to a specified rim width. The present teaching is particularly suitable for spindles of tyre testing device.

4 Claims, 4 Drawing Sheets

(56) References Cited

U.S. PATENT DOCUMENTS

| | | | |
|---|---|---|---|
| 5,107,702 A | 4/1992 | Iwama | |
| 5,257,561 A | 11/1993 | Folta | |
| 2011/0011171 A1* | 1/2011 | Nakano | B60C 25/00 |
| | | | 73/146 |
| 2011/0203362 A1* | 8/2011 | Imamura | G01M 17/021 |
| | | | 73/146 |
| 2015/0047790 A1 | 2/2015 | Matsunaga et al. | |

OTHER PUBLICATIONS

International Search Report and Written Opinion of the International Searching Authority; Application No. PCT/SK2020/050003; Completed: May 27, 2020; dated Jun. 5, 2020; 10 Pages.

* cited by examiner

CLAMPING MECHANISM FOR A TYRE TESTING DEVICE AND METHOD FOR CLAMPING A TESTED TYRE INTO THE CLAMPING MECHANISM

TECHNICAL FIELD

The present teaching relates to a tyre testing device which checks the uniformity and/or geometric properties of manufactured tyres, and in particular to a method of clamping tyres tested in an inflated condition.

BACKGROUND

Testing devices for testing tyres in the inflated condition are designed in structural manner so that the tested tyre is mounted between a pair of detachable rims, where the tyre is inflated to a specified pressure and bring out into rotation. Various types of such devices are used in practice to test uniformity, geometry and balance of tyres.

When testing uniformity, a tyre tread is pressed against a load wheel that substitutes a road surface, and variation of forces acting between the tyre and the load wheel is measured by load sensors. When testing geometric properties, contactless measurement of a shape variation of a rotating tyre is performed. When testing the balance, dynamic effects of a rotating tyre caused by its unbalance are measured.

In the known and used solutions of the testing devices, a complete spindle of a machine consists of a fixed part that provides a drive for tyre rotation and a movable part that forms a necessary gap between the rims for accommodating the tested tyre. A rotational axis of the spindle is usually vertical. Depending on the type of a design of the testing device, the upper or lower spindle may be fixed. The free spindle, in addition to the rotational movement, allows movement of the respective rim in the manner parallel to the rotational axis, which is utilised for clamping or releasing the tested tyre.

Advanced testing devices also include a mechanism for automatic adjustment of a rim width, i.e., a distance between the detachable rims after clamping the tyre. The mechanism increases efficiency of the device, since it enables testing tyres of different design widths in succession, whereby the necessary adjustment of the rim position is carried out automatically.

It is a specific task to clamp tyres with collapsed sidewalls, the inflation of which is problematic due to leakage of the inflation air through a gap between the rim and the sidewall. The reason of the collapsed sidewall is primarily the effect of gravitational forces acting on a horizontally positioned non-inflated tyre. The phenomenon is more common for tyres having a higher sidewall and manufactured from softer compounds.

There are known solutions for a tyre clamping system capable of supporting inflation of tyres having narrow or collapsed sidewalls, so that the tyre is sealed and inflated at a smaller rim width, and afterwards the rim is opened to a specified width. A challenge in the process is to design a rim opening under the effect of forces of the inflated tyre.

Document U.S. Pat. No. 4,852,398A describes a machine for testing tyre uniformity and having a fixed spindle holding an upper rim and a vertically positioning lower rim. The machine comprises a conveyor belt, by means of which the tested tyre is transported above the lower rim. The lower rim together with the tyre are lifted by a hydraulic mechanism and connected concentrically to the upper spindle by means of a centring cone. Consequently, the tyre is inflated, spun and a measurement is performed under the action of a load wheel. The lifting of the lower rim and its lowering after completion of the measurement is performed by means of a hydraulic cylinder. The cylinder has to be capable to generate sufficient force to overcome the extension forces acting on the rims from the inflated tyre. The cylinder force has to be also sufficiently large for holding the centring cone to provide for the alignment of the rims and simultaneously to create necessary friction to transmit torque from the driven upper spindle onto the lower one. Adjustment of a rim width is provided by positioning the lower rim to a defined height using the hydraulic servo mechanism. Consequently, the centring cone is movable with respect to the lower rim in the direction of the rotational axis and the necessary force action is provided by a spring.

The described system having hydraulic positioning also allows, in principle, a support for inflation of tyres having collapsed sidewalls; its disadvantage, however, is the necessity of using hydraulic energy. It means, for the users, increased machine noise sourcing from the hydraulic power unit, a risk of environmental pollution, demanding maintenance as well as a danger due to high pressures.

There are known testing devices that, when clamping tyres, do not use hydraulic energy for mutual fixation of the positions of both rims/spindle parts, but they use mechanical locks. Such device is disclosed, for example, in document U.S. Pat. No. 5,257,561A, describing a clamping mechanism, which enables mechanical locking of the rims for different tyre widths. The solution, however, does not allow approximation of the rims when inflating the tyres having the collapsed sidewall. The solution for inflation of deformed tyres for such clamping mechanisms is disclosed in document US20110203362A1, but the described method is less effective than approximation of the rims, and it causes increased load on the conveyor in the machine.

Another possibility of the rim width adjustment is the use of a helix for axial displacement of the rim on the fixed part of the spindle—an example is cited in document U.S. Pat. No. 5,107,702A. The rim is connected slidably to a nut, which, after locking its rotational movement with respect to the machine frame, moves axially along a helix machined on the spindle surface, when the fixed spindle is rotated. In these devices, the adjustment of the rim width is usually carried out in the no-load condition before locking the spindle and inflating the tyre, which again does not support inflation of the tyres with collapsed sidewalls.

The principle of the rim width adjustment according to document U.S. Pat. No. 5,107,702A is also used in machines having mechanical clamping and having support for inflation of deformed tyres. In this case, the rotational movement of the nut for the rim width adjustment is blocked by a controlled brake. The tyre is clamped at a reduced rim width, it is inflated, and then, with the nut being braked, the rim width is adjusted to a specified value by means of rotation of the spindle. However, due to the forces acting from the inflated tyre, high friction in the threads between the nut and the helix and simultaneously significant stress on the brake mechanism occur, which result in increased maintenance requirements and adversely affect machine reliability.

EP2244082A1 discloses automatic visual inspection equipment of a tire in which eccentricity of a rim-assembled tire due to deformation is prevented by preventing the tire from being burdened with the bad of an upper rim thereby preventing deformation of the tire due to the load of the upper rim. In the tire rim-assembling mechanism of the automatic visual inspection equipment of tire, an upper rim which is fixed to the upper surface of tire fixed horizontally onto a lower rim is previously pulled up to the side of a main shaft by means of an upper rim pull-up mechanism, which is fixed to the side of a main shaft.

SUMMARY

The subject of the present teaching includes a clamping mechanism for a tyre testing device enabling compensation of tyre sidewall collapse during testing, which comprises the following:

A supporting bracket provided with a vertical guide

A trolley fitted to the vertical guide provided with a first centring member,

A vertically arranged spindle formed by a lower fixed spindle and an upper moveable spindle both arranged on one rotational axis A, where Both the lower fixed spindle and the upper moveable spindle are provided with rims facing each other, for clamping a tested tyre, The lower fixed spindle is adapted for rotational movement, The upper moveable spindle is positioned under the trolley and freely suspended in the supporting bracket in order to enable rotational movement as well as the movement in the direction of a rotational axis A, The lower fixed spindle as well as the upper moveable spindle are provided with a bayonet lock for their mutual locking, The upper moveable spindle is provided with the second centring member adapted to latch into the first centring member of the trolley, The upper moveable spindle is further provided with a compensation chamber enabling insertion of the lower fixed spindle for compensation of a collapse of a tyre sidewall, A pneumatic cylinder for controlling movement of the trolley in the supporting bracket along the vertical guide in the direction of the rotational axis A for centring the upper moveable spindle with respect to the rotational axis A through the first and second centring members, A servo drive for controlling movement of the supporting bracket in the direction of the rotational axis A between an open position enabling insertion of the tested tyre between the rim of the upper moveable spindle and the rim of the lower fixed spindle, and the locked position, where the tested tyre is clamped between the rims.

According to a preferred embodiment the clamping mechanism may further comprise a support of the moveable spindle located between the upper moveable spindle and the supporting bracket in order to provide parallelism of the rims when clamping the tyre.

The subject matter of the present teaching also includes a method of clamping a tested tyre into a clamping mechanism according to the present teaching. The method comprises the following steps:

Positioning of an upper moveable spindle by means of a supporting bracket into an open position, Insertion of a tested tyre onto a rim of a lower fixed spindle, Centring the upper moveable spindle with respect to a rotational axis A by a force exerted by a pneumatic cylinder in the direction of the rotational axis A on the upper moveable spindle by means of a trolley and first and second centring members, Positioning of the upper moveable spindle and the lower fixed spindle for locking of a bayonet lock using a compensation chamber, Exerting a force of the pneumatic cylinder on the upper moveable spindle until complete sealing of the tested tyre having a collapsed sidewall between rims, Inflation of the sealed tested tyre until the force of the tyre sidewall exceeds the force exerted by the pneumatic cylinder and a distance between the rims reaches a specified value for a specific type of the tested tyre, wherein clamping of the tested tyre is completed when contact surfaces of the bayonet lock lean against each other and the bayonet lock is locked, wherein tyre inflation pressure and the force exerted by the pneumatic cylinder are coordinated, Lifting of the trolley by means of the pneumatic cylinder and its detachment from the upper moveable spindle.

The clamping mechanism for the tyre testing device according to the present teaching enables compensation of the tyre sidewall collapse during testing, so that it is also possible to provide for inflation of deformed tyres. The present teaching does not need hydraulic energy and it enables adjustment of the sidewall collapse compensation to a large extent for individual tyre types according to a recipe. The process of the collapse compensation and mutual fixation of the fixed and movable parts of the spindle is coordinated in such a manner that there is no need to adjust the rim width after inflation of the tyre, thus reducing wear-out of the clamping mechanism.

The clamping mechanism according to the present teaching comprises the vertical spindle consisting of two mutually separable parts—the lower fixed spindle and the upper moveable spindle. Both spindles have an identical rotational axis and are provided with the rims facing each, between which the tested tyre is clamped. The bayonet lock having conical contact surfaces serves for mutual connection of the lower fixed spindle and the upper movable spindle during clamping.

The lower fixed spindle is firmly connected to a supporting frame of the device and performs only a rotational movement. The lower fixed spindle comprises a mechanism for adjusting the rim width for a particular tested tyre. The adjustment is performed automatically in unloaded state between measurements by means of changing the fixed spindle rim position along its axis. The rim width adjustment mechanism does not form part of the present teaching.

The upper movable spindle is enabled also to move in the direction of the rotational axis and comprises the compensation chamber for compensation of the sidewall collapse. The upper movable spindle assembly is fixed to the frame of the device through the supporting bracket by means of the vertical guide and is further connected to the servo drive. The supporting bracket with the vertical guide and with the servo drive form a positioning axis that enables changing the mutual vertical position of the supporting bracket and the lower fixed spindle. The supporting bracket may contain a support for the upper moveable spindle in order to provide for the parallelism of the rims when clamping the tyre.

The upper movable spindle assembly further comprises the trolley for compensation of the tyre sidewall collapse, where the trolley is connected to the supporting bracket by the vertical guide. There is the centring member on the trolley, preferably of a conical shape, which counterpart is part of the upper moveable spindle. A mutual position of the trolley and the supporting bracket is controlled by means of the pneumatic cylinder, preferably a double-action pneumatic cylinder.

In order to clamp the tyre having the collapsed sidewall, the bracket of the upper moveable spindle assembly is positioned by means of the servo drive to such height so that sufficient space between individual spindles is made in order to accommodate the tested tyre. The pneumatic cylinder is pressurized in the extended state, while the upper movable spindle is leaning against the support to provide for parallelism of the rims and at the same time centred with respect to the lower fixed spindle by the action of force of the first and second centring members.

After loading the tested tyre into the machine by means of a conveyor, the conveyor is lowered thus placing the tyre on the rim of the lower fixed spindle. Consequently, the supporting bracket of the upper moveable spindle is positioned so that the teeth of the bayonet lock of the lower fixed spindle engage between the teeth of the bayonet lock in the upper moveable spindle into the compensation chamber until the desired reduced rim width for sealing the collapsed sidewall is reached. After rotating the bayonet lock of the lower fixed spindle into the locking position the sealed tyre is inflated. When the action of force of the tyre sidewall during inflation overcomes the force of the pneumatic cylinder, the upper moveable spindle starts shifting and the rims are opening. The movement is axially guided, because the pneumatic cylinder maintains the effect of the first and second centring members by the applied force, and simultaneously it is damped, since at the same time said force regulates the opening speed of the rims. For this purpose, the tyre inflation and the magnitude of the force of the pneumatic cylinder are coordinated by means of the pressure regulation in the pneumatic cylinder. The tyre clamping is completed when the contact surfaces of the bayonet lock lean against each other, at which moment the specified rim width for the specific tyre test is reached.

Subsequently, the pneumatic cylinder is retracted, thereby separating the trolley from the upper moveable spindle (detaching the first and second centring members from each other). Thereby the locked spindle with the clamped tyre stops touching the elements of the upper moveable spindle assembly and is ready for rotation and measurement execution.

DETAILED DESCRIPTION

The particular embodiments according to the present teaching are presented by way of illustration and not by way of limitation of the technical solutions. Persons skilled in the art shall find, or will be able to find out, using no more than routine experimentation, many equivalents to the specific embodiments of the present teaching. Such equivalents will also fall within the scope of the following patent claims. An optimal design of construction and selection of its elements cannot cause any problem to the persons skilled in the art; therefore, these features have not been addressed in detail.

Example

Figure 1:
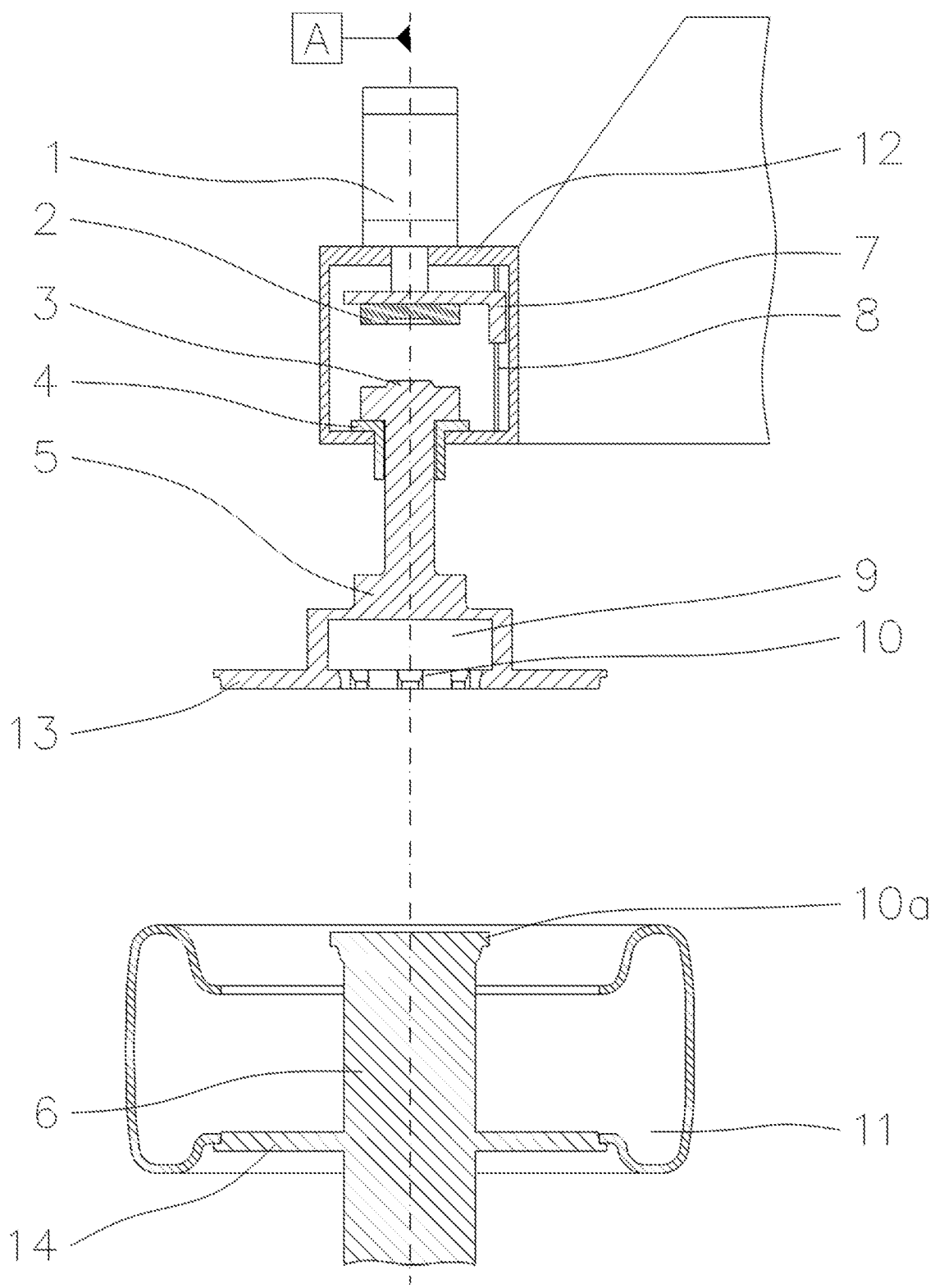
FIG. 1 shows a cross-section of a clamping mechanism for a tyre testing device according to the present teaching.

The clamping mechanism shown on FIG. 1 comprises a vertical spindle consisting of two mutually detachable portions—a lower fixed spindle 6 and an upper moveable spindle 5. Both spindles 5, 6 have identical rotational axis A and are provided with rims 13, 14 facing each other, between which a tested tyre 11 is clamped. The rim 13 of the upper moveable spindle is depicted as a component part of the upper moveable spindle 5. The rim 14 of the lower fixed spindle is depicted as a component part of the lower fixed spindle 6. The lower fixed spindle 6 is firmly connected to the supporting frame of the device and only performs rotation movement. A bayonet lock 10, 10a having conical contact surfaces serves for mutual connection of the lower fixed spindle 6 and the upper moveable spindle 5 during clamping.

In addition to rotation, the upper moveable spindle 5 is also enabled to move in the direction of the rotational axis and comprises a compensation chamber 9. The upper moveable spindle 5 assembly is fixed to the frame of the device through a supporting bracket 12 by means of a vertical guide 8 and is further connected to a servo drive that enables changing mutual vertical position of the supporting bracket 12 and the lower fixed spindle 6. A support 4 of the upper moveable spindle for providing for parallelism of the rims when clamping the tyre is located in the supporting bracket 12.

The upper moveable spindle assembly further comprises a trolley 7 for compensation of tyre sidewall collapse, the trolley is connected to the supporting bracket 12 through the vertical guide 8. The conical first centring member 2 is located on the trolley 7, and its counterpart, the conical second centring member 3, is the component part of the upper moveable spindle 5. The pneumatic cylinder 1 connected to the supporting bracket 12 acts on the trolley 7 for the sidewall collapse compensation and enables to control the movement of the trolley 7 in the vertical guide 8, as well as provides the force between the first and second centring members 2 and 3.

Figure 2:
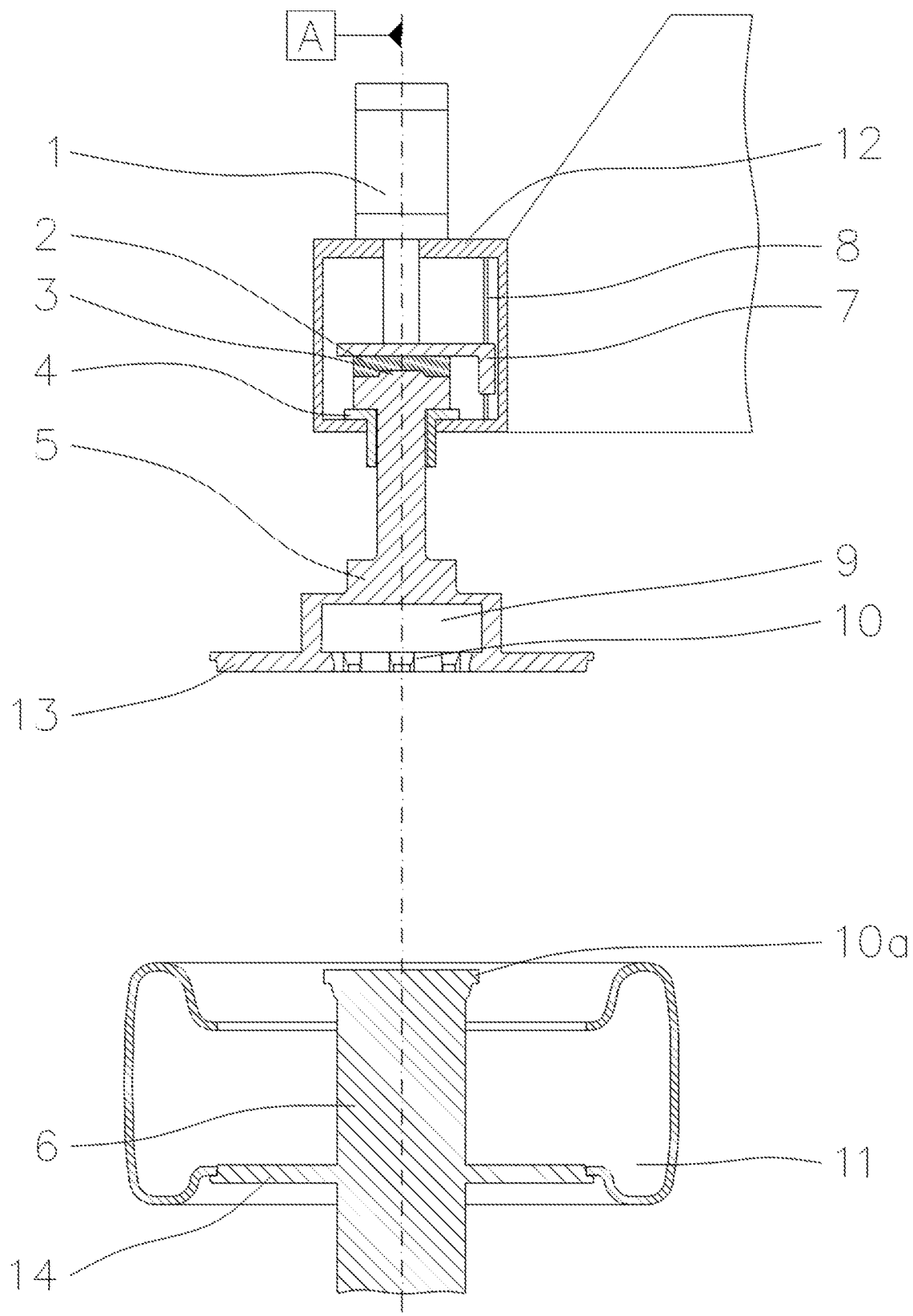
FIG. 2 shows the clamping mechanism in a basic position.
Figure 3:
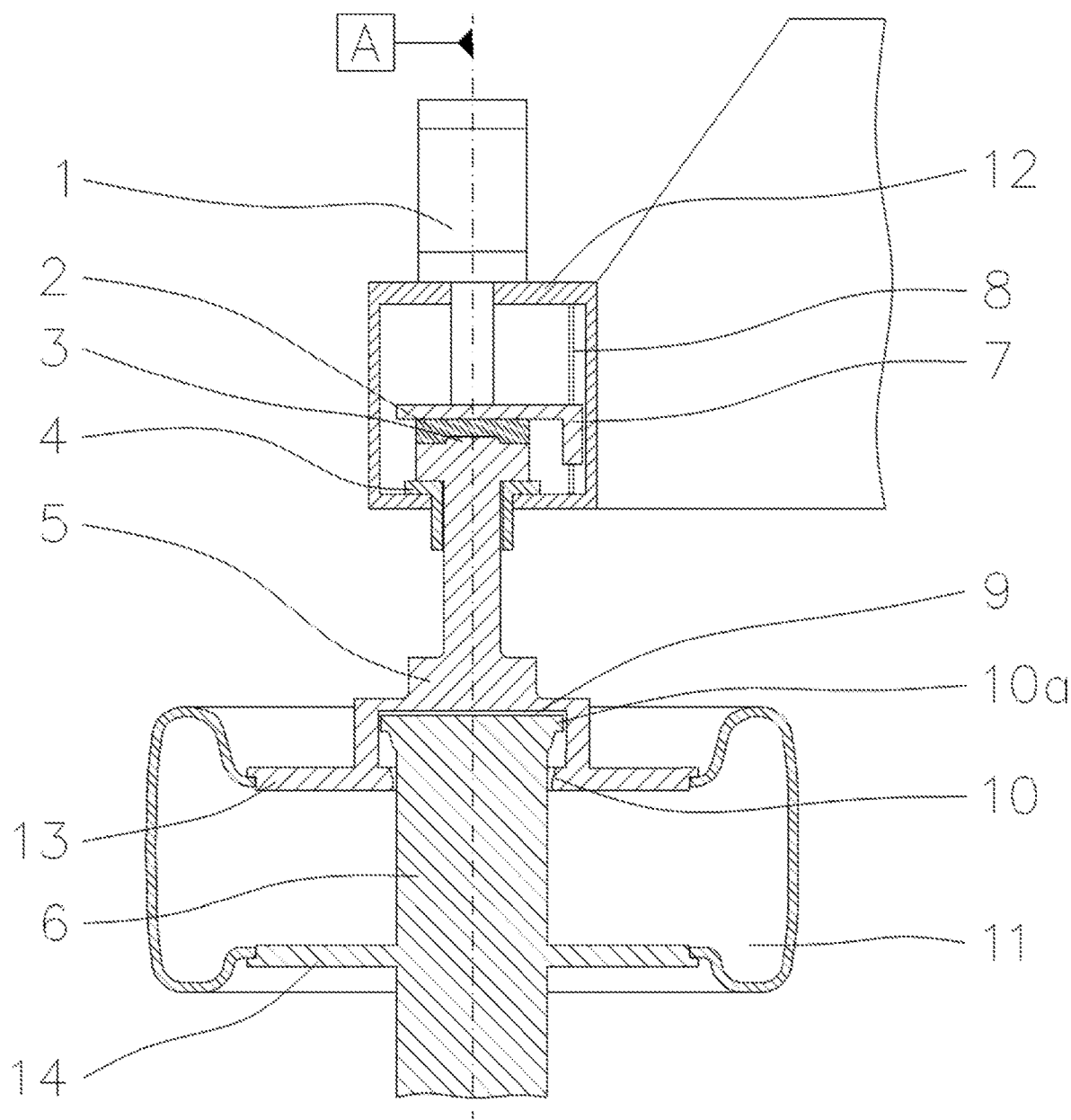
FIG. 3 shows the clamping mechanism in a position of maximum compensation of a deformed tyre sidewall.
Figure 4:
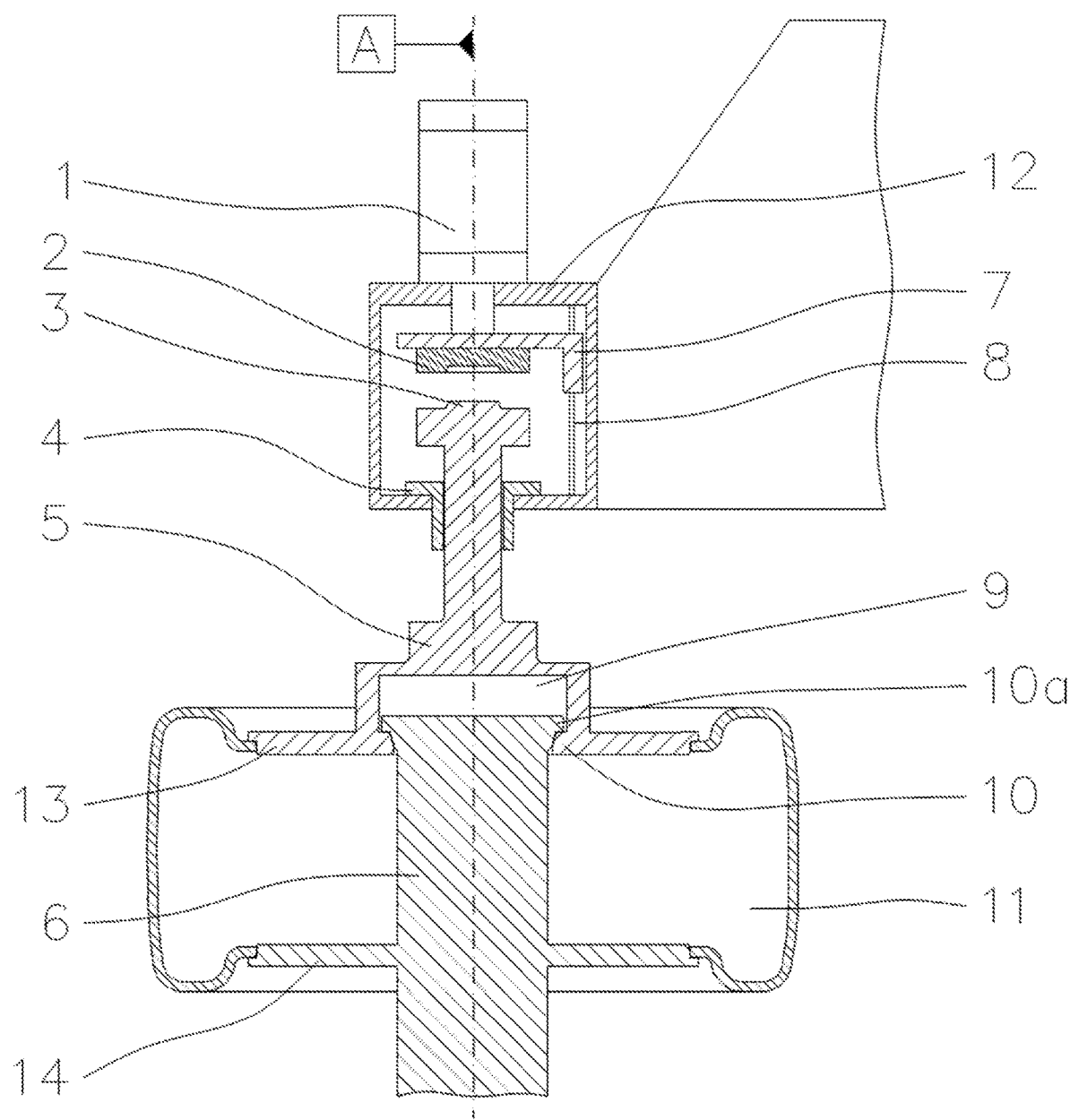
FIG. 4 shows the clamping mechanism with a clamped and inflated tyre.

The principle of the sidewall collapse compensation according to the present teaching is depicted on FIGS. 2 to 4.

The basic position of the assembly is depicted on FIG. 2. The supporting bracket 12 of the upper moveable spindle 5 is vertically positioned so that there is a space for accommodating the tested tyre 11 between the upper moveable spindle 5 and the lower fixed spindle 6. The pneumatic cylinder 1 presses the first centring member 2 onto the upper moveable spindle 5 through the trolley 7 along the vertical guide 8. The upper moveable spindle 5 is suspended on a support 4. Interaction of the first and second centring members 2 and 3 results in centring of the upper moveable spindle 5 with respect to the lower fixed spindle 6.

After loading into the device, the tested tyre 11 is placed on the rim 14 of the lower fixed spindle.

The upper moveable spindle 5 approaches the lower fixed spindle 6 by downward positioning the supporting bracket 12 of the upper spindle 5. The lower fixed spindle 6 has to be rotated so that teeth of the bayonet lock 10a of the lower fixed spindle 6 point to the gaps of the bayonet lock 10 of the upper moveable spindle 5. Simultaneously, the pneumatic cylinder 1 presses the upper moveable spindle 5 to the support 4, thereby forming force connection between the rim 13 of the upper moveable spindle and the supporting bracket 12 of the upper moveable spindle 5, the latter being connected to the machine frame. The force connection provides for pressing the sidewalls of the tyres having greater width compared to a specific one.

During approaching movement of the upper moveable and lower fixed spindles 5, 6 the path is extended by compensation of the sidewall collapse of the tyre 11, thereby achieving proximity of the rims 13, 14 and sealing of even such deformed tyre. The movement without collision is enabled by the compensation chamber 9 in the upper moveable spindle 5. A maximum achievable compensation range is documented on FIG. 3.

In case of using a bayonet locking principle the teeth of the bayonet lock 10, 10a are positioned against each other by rotating the lower fixed spindle 6 with respect to the upper moveable spindle 5, thereby performing preparation for locking.

Subsequently, the sealed tyre 11 is inflated. The action of force of the tyre 11 sidewall on the rim 13 of the upper moveable spindle during inflation overcomes the force of the pneumatic cylinder 1. As the consequence of the resulting acting force the upper moveable spindle 5 moves parallel to the vertical guide 8 and the rims 13 and 14 open to a width specified for a particular tyre 11. Until the moment the teeth of the bayonet lock 10, 10a lean against each other, the upper spindle 5 is guided and centred by the first and second centring members 2 and 3.

During inflation of the tyre 11 and opening the rims 13 and 14 the pneumatic cylinder 1 acts as a damping element that protects teeth of the bayonet lock 10, 10a against excessive shocks by means of force acting against the tyre 11 sidewall. The intensity of damping is adjusted by modification of the force of the pneumatic cylinder 1 by regulation of pressure therein.

After locking the bayonet lock 10, 10a the trolley 7 provided with the first centring member 2 is lifted by means of the pneumatic cylinder 1, as depicted on FIG. 4, thereby simultaneously detaching the upper moveable spindle 5 from the trolley and by means of the bayonet lock 10, 10a it remains centred and connected to the lower fixed spindle 6. The tested tyre 11 is clamped and ready for testing.

The invention claimed is:
1. A clamping mechanism, for a tyre testing device, enabling compensation of a tyre sidewall collapse during testing, which comprises:
    a supporting bracket having a vertical guide,
    a trolley disposed on the vertical guide and configured to move along a length of the vertical guide, the trolley having a first centering member,
    a vertically arranged spindle formed by a lower fixed spindle and an upper moveable spindle both arranged on one rotational axis, where:
        the lower fixed spindle and the upper moveable spindle have rims facing each other, for clamping a tested tyre,
        the lower fixed spindle is configured to perform rotational movement,
        the upper moveable spindle is positioned under the trolley and freely suspended in the supporting bracket in order to perform rotational movement as well as movement in a direction of the rotational axis,
        the lower fixed spindle and the upper moveable spindle are configured to mutually lock together through a bayonet lock,
        the upper moveable spindle includes the second centering member adapted to engage the first centering member of the trolley,
        the upper moveable spindle includes a compensation chamber that enables insertion of the lower fixed spindle to provide compensation of the tyre sidewall collapse,
    a pneumatic cylinder configured to control the trolley movement in the supporting bracket along the vertical guide in the direction of the rotational axis for centering the upper moveable spindle relative to the rotational axis through the first and second centering members,
    a servo drive configured to control movement of the supporting bracket in the direction of the rotational axis between an open position enabling insertion of the tested tyre between the rim of the upper moveable spindle and the rim of the lower fixed spindle, and a locked position, where the tested tyre is clamped between the rims.

2. The clamping mechanism according to claim 1 wherein a support of the upper moveable spindle is disposed between the upper moveable spindle and the supporting bracket in order to provide for parallelism of the rims at clamping the tyre.

3. The clamping mechanism according to claim 1, wherein the lower fixed spindle is configured to perform only rotational movement.

4. A method of clamping a tyre into a clamping mechanism for a tyre testing device, the clamping mechanism including:
    a supporting bracket having a vertical guide,
    a trolley disposed on the vertical guide and having a first centering member,
    a vertically arranged spindle formed by a lower fixed spindle and an upper moveable spindle both arranged on one rotational axis, wherein the lower fixed spindle and the upper moveable spindle have rims facing each other, for clamping a tested tyre, wherein the lower fixed spindle is configured to perform rotational movement, wherein the upper moveable spindle is positioned under the trolley and freely suspended in the supporting bracket in order to perform rotational movement as well as movement in a direction of the rotational axis, wherein the lower fixed spindle and the upper moveable spindle are configured to mutually lock together through a bayonet lock, wherein the upper moveable spindle includes the second centering member adapted to engage the first centering member of the trolley, wherein the upper moveable spindle includes a compensation chamber that enables insertion of the lower fixed spindle to provide compensation of the tyre sidewall collapse,
    a pneumatic cylinder configured to control the trolley movement in the supporting bracket along the vertical guide in the direction of the rotational axis for centering the upper moveable spindle relative to the rotational axis through the first and second centering members, and
    a servo drive configured to control movement of the supporting bracket in the direction of the rotational axis between an open position enabling insertion of the tested tyre between the rim of the upper moveable spindle and the rim of the lower fixed spindle, and a locked position, where the tested tyre is clamped between the rims;
    said method comprising:
    positioning of the upper moveable spindle through the supporting bracket into the open position,
    insertion of the tested tyre onto the rim of the lower fixed spindle,
    centering the upper moveable spindle with respect to the rotational axis by a force exerted by the pneumatic cylinder in the direction of the rotational axis on the upper moveable spindle through the trolley and first and second centering members, positioning of the upper moveable spindle and the lower fixed spindle for locking the bayonet lock using the compensation chamber, exerting the force generated by the pneumatic cylinder on the upper moveable spindle until complete sealing of the tested tyre having a collapsed sidewall between rims, inflating the sealed tested tyre until a force exerted by the tyre sidewall on the rim of the upper moveable spindle exceeds the force exerted by the pneumatic cylinder and the distance between the rims reaches a value specified for the type of the tested tyre, wherein clamping of the tested tyre is completed when contact surfaces of the bayonet lock lean against each other and the bayonet lock is locked, wherein tyre inflation pressure and the force exerted by the pneumatic cylinder are coordinated; and lifting of the trolley by the pneumatic cylinder and its detachment from the upper moveable spindle.

\* \* \* \* \*